(12) United States Patent
Banks et al.

(10) Patent No.: US 8,954,504 B2
(45) Date of Patent: Feb. 10, 2015

(54) MANAGING A MESSAGE SUBSCRIPTION IN A PUBLISH/SUBSCRIBE MESSAGING SYSTEM

(75) Inventors: Andrew D. Banks, Winchester (GB); Gavin D. Beardall, Winchester (GB); Adrian D. Dick, Winchester (GB); Brian C. Homewood, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/477,249

(22) Filed: May 22, 2012

(65) Prior Publication Data

US 2013/0138737 A1  May 30, 2013

(30) Foreign Application Priority Data

May 18, 2011  (EP) ...................................... 11166502
May 2, 2012  (WO) .................. PCT/IB2012/052191

(51) Int. Cl.
G06F 15/16  (2006.01)
H04L 29/08  (2006.01)
H04L 12/58  (2006.01)

(52) U.S. Cl.
CPC ................ *H04L 67/02* (2013.01); *H04L 12/58* (2013.01)
USPC ............ 709/204; 709/201; 709/206; 455/456

(58) Field of Classification Search
CPC ......... H04L 67/02; H04L 12/58; H04L 29/06; G06Q 10/10
USPC ....................................................... 709/204
See application file for complete search history.

(56) References Cited

U.S. PATENT DOCUMENTS

| | | | |
|---|---|---|---|
| 6,510,429 B1 * | 1/2003 | Todd ........................... | 705/36 R |
| 6,947,435 B1 | 9/2005 | Chikuma et al. | |
| 7,283,463 B2 | 10/2007 | Miller et al. | |
| 7,287,066 B2 | 10/2007 | Ruggaber et al. | |
| 7,530,078 B2 | 5/2009 | Collison et al. | |
| 7,558,210 B1 | 7/2009 | Hobson et al. | |
| 7,606,808 B2 | 10/2009 | McCann et al. | |
| 7,624,144 B1 | 11/2009 | Mitrov | |
| 7,706,895 B2 | 4/2010 | Callaghan | |
| 7,822,801 B2 * | 10/2010 | Zhao et al. .................... | 709/201 |
| 2002/0115439 A1 * | 8/2002 | Hotakainen et al. .......... | 455/435 |
| 2005/0210109 A1 | 9/2005 | Brown et al. | |
| 2006/0168331 A1 | 7/2006 | Thompson et al. | |
| 2006/0248219 A1 * | 11/2006 | Astley et al. .................. | 709/233 |
| 2007/0245018 A1 | 10/2007 | Bhola et al. | |
| 2009/0003592 A1 * | 1/2009 | Hanai ............................. | 380/29 |
| 2009/0228563 A1 | 9/2009 | Jones et al. | |

FOREIGN PATENT DOCUMENTS

| | | |
|---|---|---|
| JP | 11340986 A | 12/1999 |
| JP | 2008141361 A | 6/2008 |
| JP | 2008306600 A | 12/2008 |

OTHER PUBLICATIONS

Kodai Takato. Notification of Transmittal of the International Search Report and the Written Opinion of the International Search Authority, or the Declaration, Aug. 28, 2012, 8 pages, Japan Patent Office, Tokyo Japan.

* cited by examiner

*Primary Examiner* — Tauqir Hussain
(74) *Attorney, Agent, or Firm* — Jordan IP Law, LLC

(57) ABSTRACT

A method and computer program product is disclosed for managing a message broker and subscriber application programs in a publish/subscribe messaging system so as to maintain the state of the subscriber application program on the broker subscriber application program.

20 Claims, 8 Drawing Sheets

MANAGING A MESSAGE SUBSCRIPTION IN A PUBLISH/SUBSCRIBE MESSAGING SYSTEM

BACKGROUND

The present invention relates to a method, apparatus or computer program product for managing a message subscription in a publish/subscribe messaging system.

In computerized publish/subscribe messaging systems a subscriber application program (subscriber) may subscribe to a single message broker application program (message broker) in order to receive published messages. If this message broker fails then the subscriber can no longer receive messages. When the subscriber is reconnected to the message broker then it is likely to have missed some messages.

Some publish/subscribe messaging systems provide high reliability high availability (HRHI) message brokers to reduce the probability of loss or disruption of a subscription service. In other words, such HRHI services are arranged to maintain message order and to not lose messages for a given subscription. Such subscription services can be provided by simultaneous subscription to multiple brokers providing multiple subscription streams. The subscriptions may be received directly from the multiple message brokers or by a single subscription to an intermediate message broker.

One problem with such HRHI subscription services is that they are relatively expensive in terms of the processing required at either the message subscriber or broker application programs. For example, the state of the subscriber needs to be maintained, that is, a record of which messages from a given subscription have been received. The state enables proper recovery of the subscription after a disconnection from the relevant message brokers. Furthermore, where a single subscription is received from multiple message brokers, managing the redundant or duplicate messages is a relatively complex process.

BRIEF SUMMARY

An embodiment of the invention provides a method for managing a message subscription in a message subscription application program of a publish/subscribe messaging system, the method comprising subscribing to a subscription provided in parallel by each of a set of message brokers, the subscription comprising a common sequence of messages, each common message being associated with a common sequential message identifier (SMI), retrieving a message from a selected one of the message brokers and triggering a saving of the associated common SMI for the subscription at the message broker in response to a restart of the message subscriber, reverting to the set of message brokers to determine a latest saved SMI for the subscription at any one of the message brokers and resuming the subscription by requesting a subsequent message associated with the latest saved SMI, from a selected one of the message brokers.

The method may further comprise, in response to the resuming of the subscription from the selected message broker, instructing each of the remaining message brokers in the set to discard any queued message in the sequence prior to and including the message associated with the determined latest saved SMI. Acknowledgement of a receipt of a given message may trigger the saving of the associated common SMI. The messages may be requested in sequence from each broker in turn in accordance with a predetermined protocol. The protocol may be a round robin protocol.

Another embodiment provides a method for managing a message subscription in a message broker application program of a publish/subscribe messaging system, the method comprising subscribing to a subscription in response to a subscription request from a message subscriber, the subscription comprising a common sequence of messages, each common message being associated with a common sequential message identifier (SMI) sending a message to the message subscriber and recording the associated common SMI in association with the subscription at the message broker and sending the associated common SMI to the message subscriber in response to a request therefrom. The method may further comprise, in response to a request for a subsequent message to a given SMI sending the subsequent message. The method may further comprise, in response to the sending of the subsequent message, discarding the subsequent message and any queued prior messages in the sequence. The sending of the message to the message subscriber and the recording of the associated common SMI for the subscription may be performed in a single unit of work. The SMI may be saved to persistent storage.

A further embodiment provides a computer program product comprising, a computer readable storage medium, and computer usable code stored in the computer readable storage medium, wherein if executed by a processor, the computer usable code causes a computer to subscribe to a subscription provided in parallel by each of a set of message brokers, the subscription comprising a common sequence of messages, each common message being associated with a common sequential message identifier (SMI), retrieve a message from a selected one of the message brokers and triggering the saving of the associated common SMI for the subscription at the message broker, in response to a restart of the message subscriber, revert to the set of message brokers to determine a latest saved SMI for the subscription at any one of the message brokers and resume the subscription by requesting a subsequent message associated with the latest saved SMI, from a selected one of the message brokers.

Another embodiment provides a computer program product comprising, a computer readable storage medium, and computer usable code stored in the computer readable storage medium, wherein if executed by a processor, the computer usable code causes a computer to subscribe to a subscription in response to a subscription request from a message subscriber, the subscription comprising a common sequence of messages, each common message being associated with a common sequential message identifier (SMI), send a message to the message subscriber and recording the associated common SMI in association with the subscription at the message broker, and send the associated common SMI to the message subscriber in response to a request therefrom.

A further embodiment provides a computer program stored on a computer readable medium and loadable into the internal memory of a computer, comprising software code portions arranged, when the program is run on a computer, for performing a method for managing a message subscription in a message subscription application program of a publish/subscribe messaging system, the method comprising subscribing to a subscription provided in parallel by each of a set of message brokers, the subscription comprising a common sequence of messages, each common message being associated with a common sequential message identifier (SMI), retrieving a message from a selected one of the message brokers and triggering the saving of the associated SMI for the subscription at the message broker, in response to the restart of the message subscriber, reverting to the set of message brokers to determine the latest saved SMI for the subscription at any one of the message brokers, and resuming the subscription by requesting the subsequent message to message associated with the latest SMI, from a selected one of the message brokers.

A further embodiment provides a computer program stored on a computer readable medium and loadable into the internal memory of a computer, comprising software code portions arranged, when the program is run on a computer, for performing a method for managing a message subscription in a message broker application program of a publish/subscribe messaging system, the method comprising subscribing to a subscription in response to a subscription request from a message subscriber, the subscription comprising a common sequence of messages, each common message being associated with a common sequential message identifier (SMI), sending a message to the message subscriber and recording the associated SMI in association with the subscription at the message broker, and sending the SMI to the message subscriber in response to a request therefrom.

BRIEF DESCRIPTION OF THE SEVERAL VIEWS OF THE DRAWINGS

Preferred embodiments of the invention will now be described, by way of example, with reference to the accompanying drawings in which.

DETAILED DESCRIPTION

Figure 1:
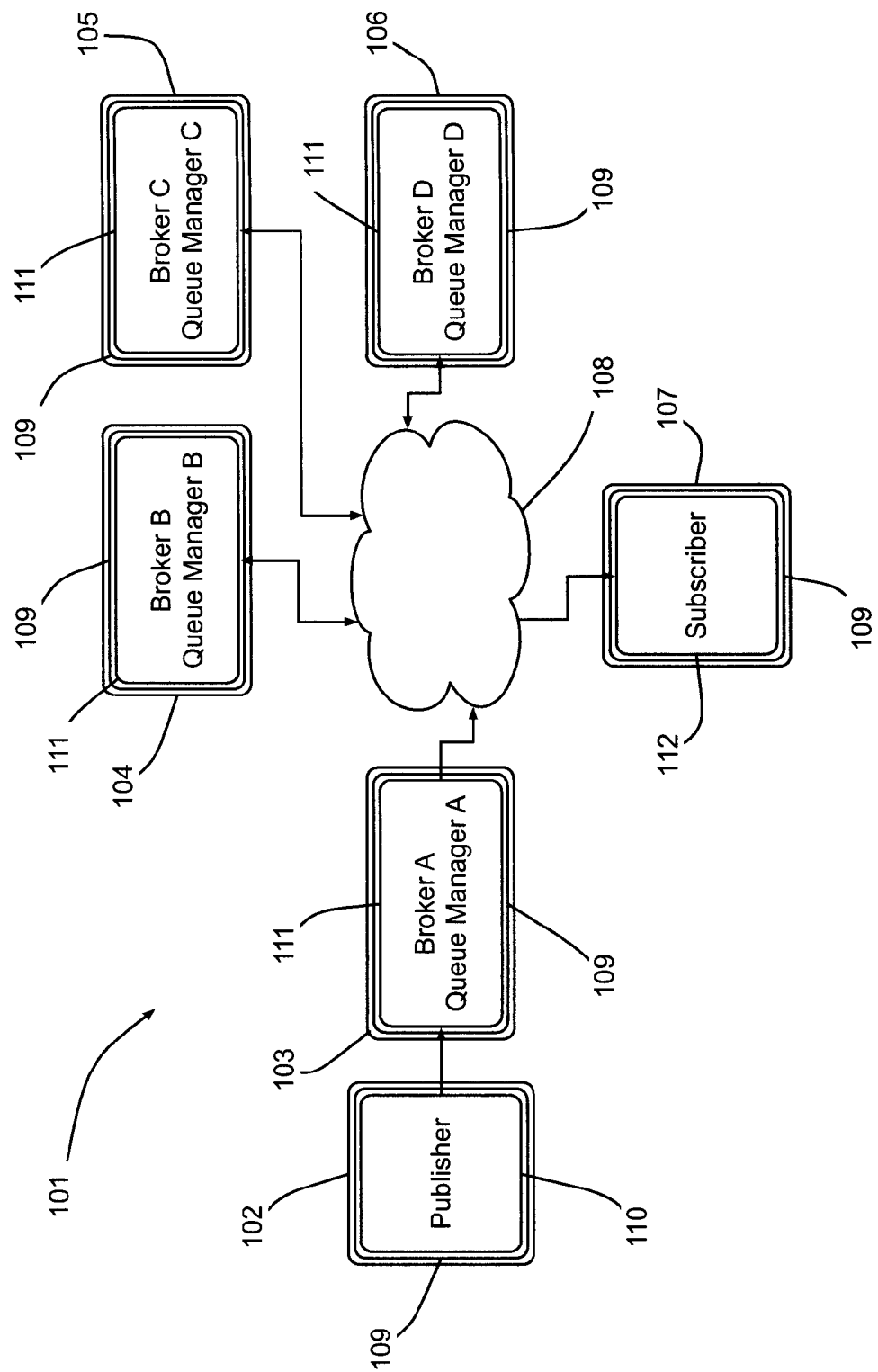
FIG. 1 is a schematic illustration of a computerized publish/subscribe messaging system.

With reference to FIG. 1, a computerized publish/subscribe messaging system 101 comprises six computers 102, 103, 104, 105, 106, 107 interconnected by a network 108 and each loaded with an operating system 109 arranged to provide a processing environment for running one or more application programs. A first of the computers 102 is arranged to run a message publisher application program (publisher) 110. A second, third, fourth and fifth of the computers 103, 104, 105, 106 are each arranged to run message broker application programs (brokers) 111, providing message brokers A, B, C, and D respectively. A sixth of the computers 107 is arranged to run a message subscriber application program (subscriber) 112. In the present embodiment, the software for the publish/subscribe messaging system 101 is provided by the IBM® WebSphere® message based middleware system from the IBM Corporation. IBM and Web Sphere are trademarks of International Business Machines Corporation, registered in many jurisdictions worldwide.

Figure 2:
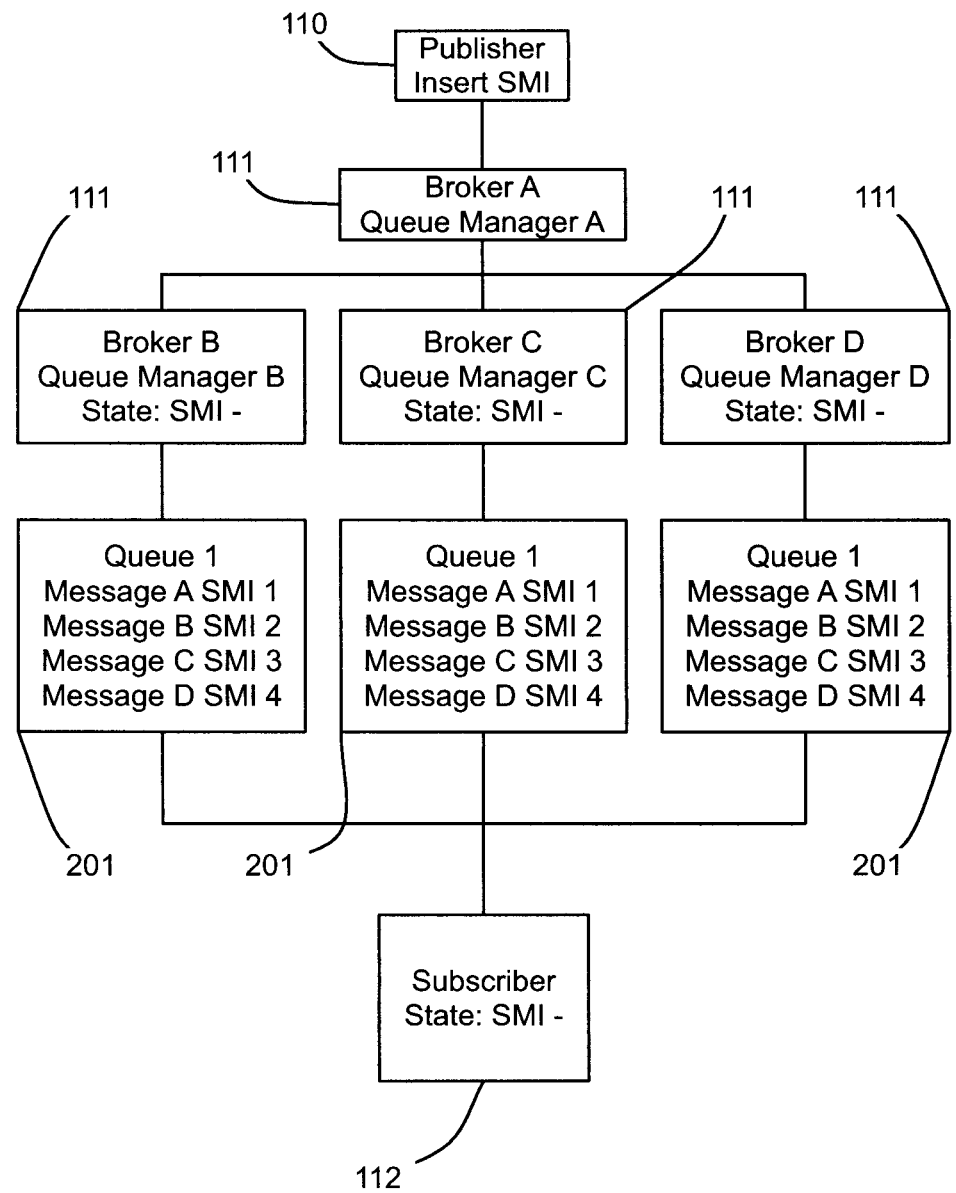
FIGS. 2, 3 and 4 are illustrated examples of the processing performed by the publish/subscribe messaging system of FIG. 1.

With reference to FIG. 2, in the present embodiment, the publisher 110 is arranged to publish messages to broker A 111. Broker A 111 is arranged, in response to a request from the subscriber 112, to provide high reliability, high availability (HRHI) subscriptions via the remaining three brokers B, C and D 111. The publisher 110 is further arranged to assign a unique sequential message identifier (SMI) to each message in the sequence of messages it publishes. An SMI is arranged to uniquely identify any message in the sequence of messages for a given subscription and also provides means to identify prior or subsequent messages to a given message in the sequence.

The HRHI brokers B, C and D 111 are arranged to provide the HRHI subscription and to maintain an associated message queue 201 for storing the unread messages for the HRHI subscription. In response to a request from the subscriber 112 to a given one of the brokers B, C and D 111, the relevant broker 111 is arranged to provide the requested message. In addition, the broker 111 is arranged to store the associated SMI for the sent message as a state variable for the associated message queue 201 on that broker 111. In other words, the saved SMI indicates the state of the HRHI subscription on the given broker 111. Each subsequently saved SMI overwrites any prior saved SMI. The SMI is saved to persistent memory at the relevant broker 111 so as to be recoverable in the event of any failure of the broker 111. The associated SMI for a given message is only saved if the requesting subscriber 112 successfully received the message. In the present embodiment, the sending of a given message and the saving of the associated SMI is arranged to be processed by the relevant broker 111 in a single unit of work, that is, as a single transaction.

The subscriber 112 is arranged to request messages for the HRHI subscription from each for the brokers B, C and D 111 in turn in accordance with a predetermined protocol. In the present embodiment, the subscriber uses a round robin protocol. The subscriber 112 is further arranged to store a copy of the SMI of the most recently successfully received message. The subscriber copy of the SMI indicates the state of the HRHI subscription for the subscriber 112. The subscriber 112 uses the stored SMI to determine the next message in the sequence of the HRHI subscription to request from the next of the brokers B, C and D 111 in accordance with the round robin message request protocol. The subscriber 112 is further arranged to manage the message queues 201 by sending discard messages to the brokers B, C and D 111 in response to the successful receipt of a given message. In other words, when the subscriber 112 receives a given message, it then issues a discard message to all the brokers B, C and D 111 that identifies the received message by its SMI. In response to such a discard message each of the brokers B, C and D 111 is arranged to discard all messages on their respective message queues 201 up to and including the message corresponding to the SMI received in the discard message.

FIG. 2 illustrates the state of the message queues 201 of each of the brokers B, C and D 111 providing the HRHI subscription and also the state of the subscriber 112 on initialization of the HRHI subscription by the subscriber 112. At start-up, the subscriber 112 makes a connection to brokers B, C and D 111 which, in the present embodiment, are the preconfigured set of brokers for providing an HRHI subscription. The subscriber 112 determines that its own state and that of each of the brokers B, C and D 111 are undefined. Thus, moving on from the state illustrated in FIG. 2, the subscriber reads the first message, that is, message A from a selected one of the brokers B, C and D 111, for example, broker B 111. Once message A is successfully received from broker B 111, the subscriber then records the SMI of "1" for message A. The subscriber then sends discard messages with an SMI=1 to the brokers B, C, D 111. The subscriber 112 then uses the round robin protocol to select the next of the brokers C, D 111 from which to retrieve the next message in the sequence, that is, message B with an SMI=2. The process then continues in the same manner.

Figure 3:
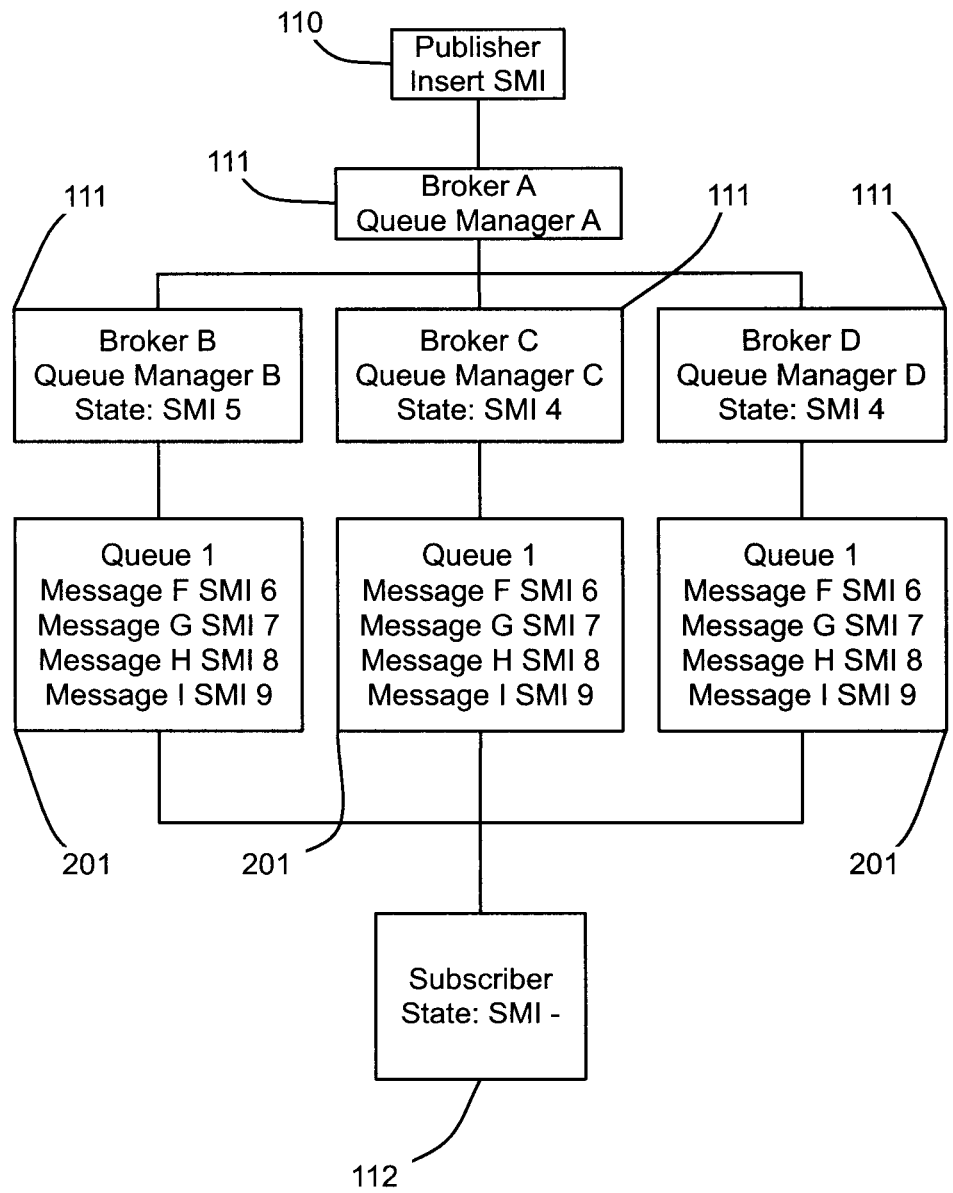

FIG. 3 illustrates the state of the messages queues 201 of each of the brokers B, C and D 111 providing the HRHI subscription and also the state of the subscriber 112 on restart of the subscriber 112 after its failure. As a result of such failure, the non-persistent copy of the last received SMI, that is the state of the subscriber 112 prior to its failure, will no longer be available. In response to a restart, the subscriber 112 is thus arranged to reconnect to the brokers B, C and D 111 and then to interrogate each one for their copy of the state of the relevant message queue 201, in the form of the respective stored SMI. In the example of FIG. 3, the highest SMI of 5 is stored at broker B 111. In response to this the subscriber 112 will send discard messages comprising data representing SMI=5 to the brokers B, C, D 111. The subscriber 112 then resumes requesting messages using the round robin protocol to select the next broker 111 and resumes operation.

Figure 4:
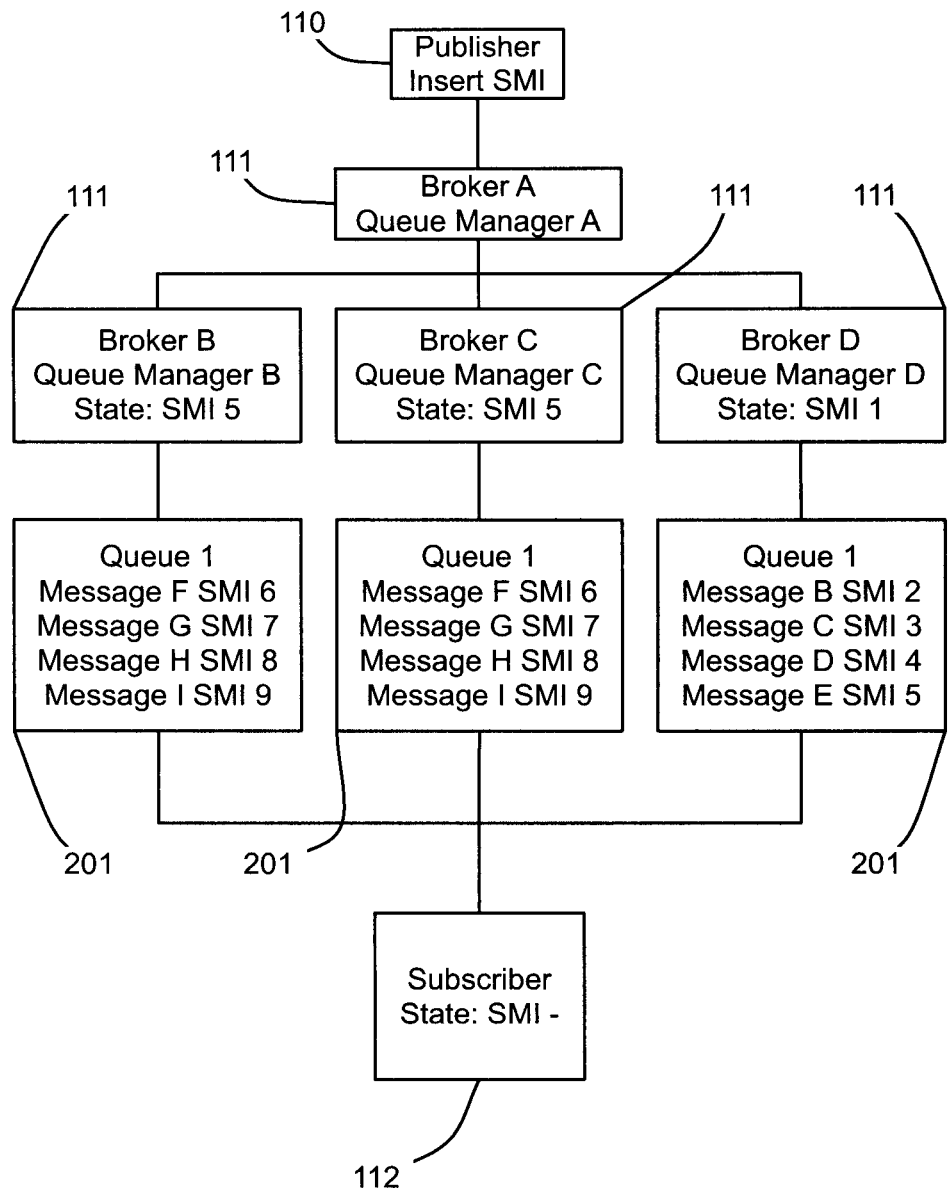

FIG. 4 illustrates the state of the messages queues 201 of each of the brokers B, C and D 111 providing the HRHI subscription and also the state of the subscriber 112 after the connection to broker D 111 or broker D 111 itself crashed and the subscriber 112 could no longer retrieve messages from broker D 111. While broker D was down the subscriber 112 continued to receive an unbroken sequence of messages from the other brokers B, C 111. Thus, the state and message queue 201 of broker D 111 has fallen out of synchronisation with the remaining brokers 111. Therefore, in response to broker D becoming available again, the subscriber 112 is arranged to send a discard message to the reconnected broker D 111 comprising the current state of the subscriber, that is SMI=5. The discard message has the effect of re-synchronising the message queue 201 and state of the reconnected broker D 111 by the discarding of messages 2 to 5 and setting the broker state to SMI=5.

In summary, if the subscriber 112 remains running, as long as one of the brokers 111 stays running, an unbroken sequence of messages will be received by the subscriber 112 with no duplicates. If the subscriber 112 fails, then on restart, as long as a broker 111 is running which has the most recent SMI, then the subscriber 112 will have received an unbroken sequence of messages with no duplicates.

Figure 5:
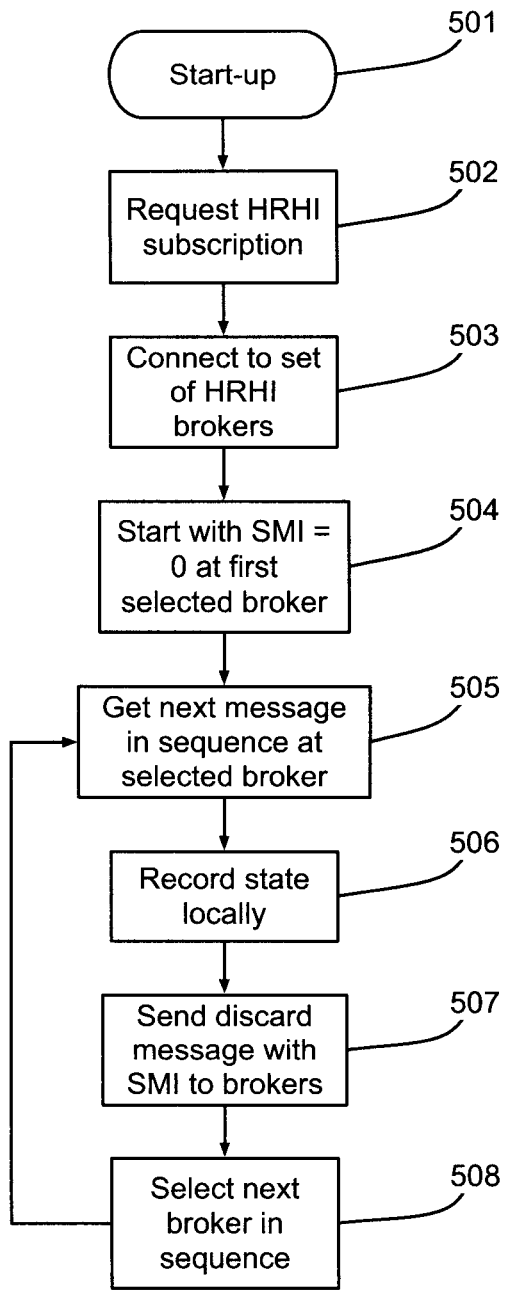
FIGS. 5, 6 7 and 8 are flow charts illustrating processing performed by a message subscriber application program in the publish/subscribe messaging system of FIG. 1.

The processing performed by the subscriber 112 when setting up an HRHI subscription will now be described further with reference to the flow chart of FIG. 5. Processing is initiated by the start-up of the subscriber application program 112 and processing moves to step 502. At step 502 a request is sent to a connected broker 111 for an HRHI subscription and processing moves to step 503. At step 503, in response to the receipt of data identifying the set of brokers 111 providing the HRHI subscription, connections are made to each respective broker 111 and processing moves to step 504. At step 504, the state of the subscriber is initialized to zero (SMI=0) and a first of the set of HRHI brokers 111 is selected in accordance with the round robin protocol and processing moves to step 505. At step 505 the first message in the sequence which, in the present embodiment has an SMI=1, is requested from the selected broker and processing moves to step 506. At step 506, in response to the successful receipt and acknowledgement of the requested message, the new state is recorded at the subscriber 112 and processing moves to step 507. At step 507 a discard message is sent to the set of HRHI brokers 111 identifying the last read message via its associated SMI and processing moves to step 508. At step 508 the next broker is selected in accordance with the round robin protocol and processing moves to step 505 and proceeds as described above.

Figure 6:
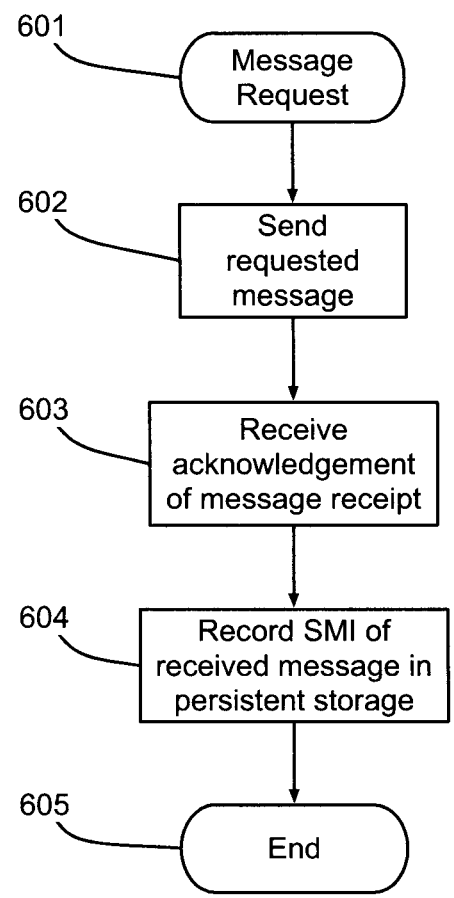

The processing performed by one of the brokers 111 in response to a message request from the subscriber 112 will now be described further with reference to the flow chart of FIG. 6. Processing is initiated at step 601 by the receipt of a message request for an HRHI subscription and processing moves to step 602. At step 602 the requested message is sent to the requestor and processing moves to step 603. At step 603 an acknowledgement of receipt of the message by the requestor is awaited and once received processing moves to step 604. At step 604 the SMI of the successfully sent message is recorded as the state of the relevant HRHI message queue 201. Processing then moves to step 605 and ends.

Figure 7:
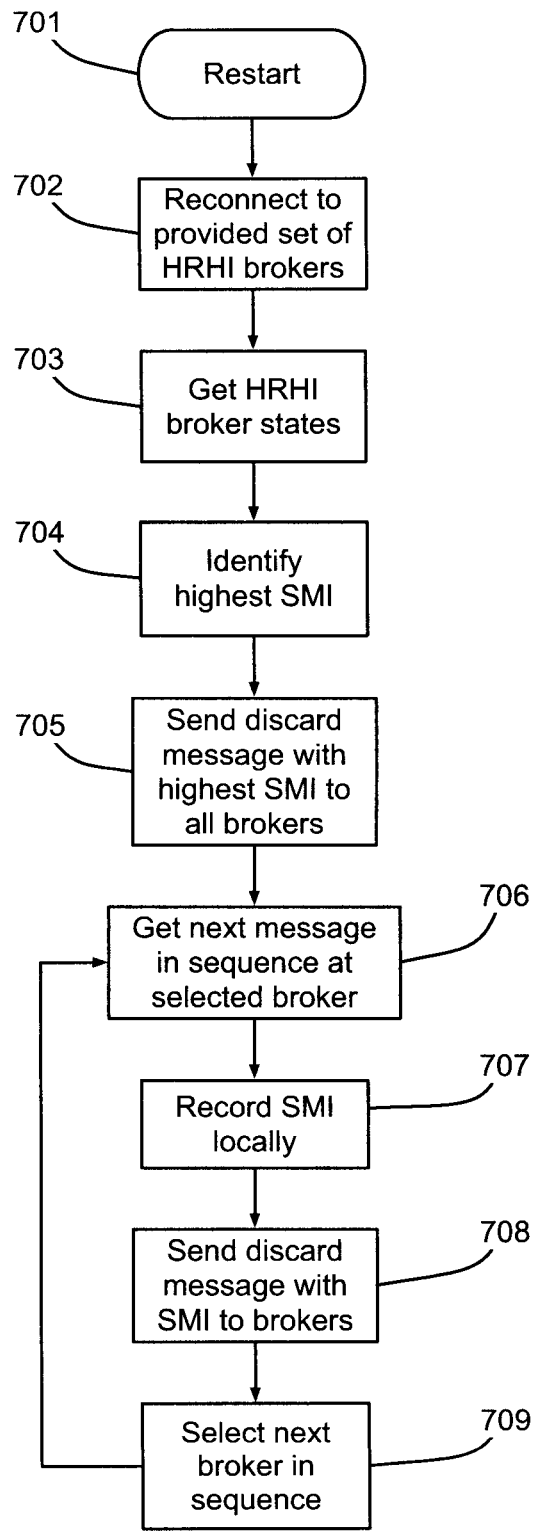

The processing performed by the subscriber 112 when restarting after a failure or crash will now be described further with reference to the flow chart of FIG. 7. Processing is initiated by the restart of the subscriber application program 112 and processing moves to step 702. At step 702 the connections to the set of HRHI brokers 111 are re-established and processing moves to step 703. At step 703 the state of the relevant queue 201 at each of the HRHI brokers 111 is determined and processing moves to step 704. At step 704 the most recent broker state, that is, the highest SMI from the set of brokers, is identified and processing moves to step 705. At step 705 a discard message is sent to the set of HRHI brokers 111 identifying the SMI of the most recent broker state and processing moves to step 706. From step 706 through to step 709 processing proceeds as described above with reference to FIG. 5 for equivalent steps 505 to 508.

Figure 8:
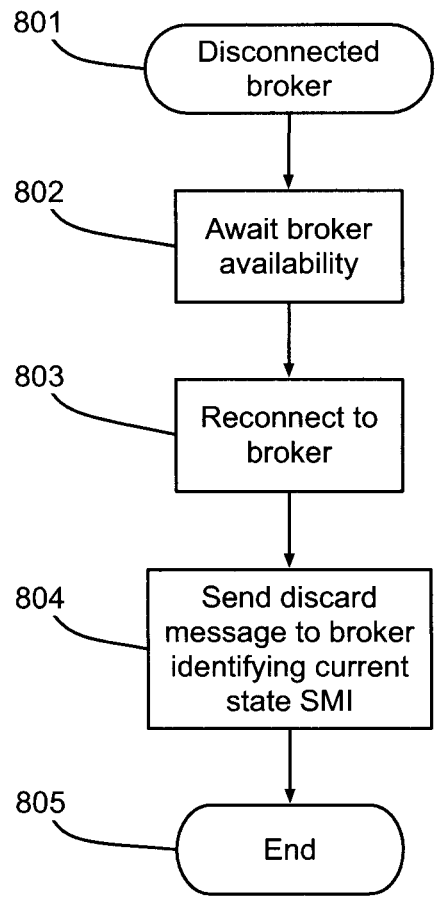

The processing performed by the subscriber 112 in response to the loss of a connection to an HRHI broker 111 will now be described further with reference to the flow chart of FIG. 8. Processing is initiated by the loss of a connection to an HRHI broker 111 and processing moves to step 802. At step 802 processing waits for the disconnected broker to become available before moving on to step 803. At step 803 the connection to the broker 111 is re-established and processing moves to step 804. At step 804 a discard message is sent to the reconnected broker 111 identifying the current state (SMI) of the subscriber 112. Processing then moves to step 805 and ends.

In a further embodiment, the brokers handle all discards cooperatively. In other words, each broker is able to communicate its discarding to the other brokers of the set of HRHI brokers so as to remove the discarding function from the subscriber. On the reconnection of a broker after its failure or the failure of its connection to the subscriber, the broker is arranged to interrogate the other brokers of the HRHI set to determine the appropriate messages to discard. On restart of the subscriber the discard process proceeds as describe above with reference to FIG. 7.

In another embodiment, in response to a request for an HRHI subscription from a subscriber to a broker, the broker is arranged to recruit a set of HRHI broker recruits on-the-fly.

In a further embodiment, an intermediate broker is arranged to provide the HRHI subscription to the requesting subscriber. The intermediate HRHI broker is arranged to insulate the subscriber from the processing of the set of HRHI brokers providing the requested subscription. The intermediate HRHI broker effectively acts as an intermediate subscriber with the functions of the subscriber as described above. The requesting subscriber need have no additional functionality above that of a standard subscriber for the relevant system. For example, intermediate HRHI broker performs the broker selection protocol and manages the relevant HRHI message queues on the HRHI brokers via relevant discard messages. The end subscriber need not be aware that an HRHI subscription is being provided or may be provided with the option to specifically select a high-reliability subscription.

In another embodiment, the subscriber could be configured to fail if all brokers are not available at restart. This avoids the possibility of the subscriber receiving any duplicate messages in particular failure scenario. In the failure scenario, if the subscriber 112 fails just after reading a message from one broker 111 before it has got to the next broker 111 to discard the message this may result in the most recent SMI being only on one broker. If that particular broker is not available at restart, then a duplicate message would be read.

Embodiments of the invention provide a lightweight highly available publish/subscribe messaging. Rather than storing state in the client, embodiments use the broker's persistent storage to keep the last sequence number and only require a simple transaction on the broker. This avoids complicated synchronized transactions between subscriber and broker. Every time a valid message is read from a broker its sequence number is written back to persistent storage on that same broker, in one unit of work, in a place that is associated with the relevant subscription or topic. All other messages that have a sequence number less than or equal to the current one are discarded from the brokers. It is not necessary for the broker application to actually get the whole message when it is discarding it, only the sequence number is required to decide whether a message is required or not. So for large amounts of data the overhead of discarding redundant messages is reduced. If a broker becomes unavailable then any of the other brokers can be used to retrieve the next message and to store the latest valid sequence number. As long as at least one broker is available there will be no loss of data and message ordering will be maintained. If the subscriber becomes disconnected or all brokers fail, on reconnection, the subscriber scans all of the broker's persistent storage for the highest sequence number and uses that as the starting point to begin receiving messages again. If the subscriber unsubscribes then an unsubscribe message is sent between the brokers. If a broker is not available when the unsubscribe message is sent the broker is arranged to process the unsubscribe message on restart.

As will be understood by those skilled in the art, embodiments of the invention may be implemented using any suitable publish/subscribe system.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

We claim:

1. A method for managing a message subscription in a message subscription application program of a publish/subscribe messaging system, the method comprising:

subscribing, via a message subscriber, to a subscription provided in parallel by each of a set of message brokers, said subscription comprising a common sequence of messages, each common message being associated with a common sequential message identifier (SMI);

retrieving a message from a selected one of said message brokers and triggering a saving of the associated common SMI for said subscription at said message broker;

in response to a restart of said message subscriber, determining whether all of said message brokers are available, and when all of said message brokers are not available, reverting to said set of message brokers to determine a latest saved SMI for said subscription at any one of said message brokers; and resuming said subscription by requesting a subsequent message associated with said latest saved SMI, from a selected one of said message brokers.

2. The method according to claim 1 comprising:

in response to said resuming of said subscription from said selected message broker, instructing each of the remaining message brokers in said set to discard any queued message in said sequence prior to and including the message associated with said determined latest saved SMI.

3. The method according to claim 1, wherein acknowledgement of a receipt of a given message triggers the saving of said associated common SMI.

4. The method according to claim 1, wherein said messages are requested in sequence from each broker in turn in accordance with a predetermined protocol.

5. The method according to claim 4, in which said protocol is a round robin protocol.

6. A method for managing a message subscription in a message broker application program of a publish/subscribe messaging system, the method comprising:

subscribing, via a set of message brokers, to a subscription provided in parallel in response to a subscription request from a message subscriber, said subscription comprising a common sequence of messages, each common message being associated with a common sequential message identifier (SMI);

sending a message to said message subscriber and recording the associated common SMI in association with said subscription at said message broker;

in response to a restart of said message subscriber, determine whether all of said message brokers are available, and when all of said message brokers are not available, determine a latest saved SMI for said subscription at any one of said message brokers; and sending said associated common SMI to said message subscriber in response to a request therefrom.

7. The method according to claim 6, further comprising:

in response to a request for a subsequent message to a given SMI, sending said subsequent message.

8. The method according to claim 7, further comprising:

in response to said sending of said subsequent message, discarding said subsequent message and any queued prior messages in said sequence.

9. The method according to claim 6, wherein said sending of said message to said message subscriber and said recording of said associated common SMI for said subscription are performed in a single unit of work.

10. The method according to claim 6, wherein said associated common SMI is saved to persistent storage.

11. A computer program product comprising;

a computer readable storage medium; and computer usable code stored in the computer readable storage medium, wherein if executed by a processor, the computer usable code causes a computer to:

subscribe to a subscription provided in parallel by each of a set of message brokers, said subscription comprising a common sequence of messages, each common message being associated with a common sequential message identifier (SMI);

retrieve a message from a selected one of said message brokers and triggering a saving of the associated common SMI for said subscription at said message broker;

in response to a restart of said message subscriber, determine whether all of said message brokers are available, and when all of said message brokers are not available, revert to said set of message brokers to determine a latest saved SMI for said subscription at any one of said message brokers; and resume said subscription by requesting a subsequent message associated with said latest saved SMI, from a selected one of said message brokers.

12. The computer program product according to claim 11 wherein if executed, the computer usable code further causes a computer to:

in response to said resuming of said subscription from said selected message broker, instruct each of the remaining message brokers in said set to discard any queued message in said sequence prior to and including the message associated with said determined latest saved SMI.

13. The computer program product according claim 11, wherein acknowledgement of a receipt of a given message triggers the saving of said associated SMI.

14. The computer program product according to claim 11, wherein said messages are requested in sequence from each broker in turn in accordance with a predetermined protocol.

15. The computer program product according to claim 14, in which said protocol is a round robin protocol.

16. A computer program product comprising;

a computer readable storage medium; and computer usable code stored in the computer readable storage medium, wherein if executed by a processor, the computer usable code causes a computer to:

subscribe to a subscription in response to a subscription request from a message subscriber, said subscription comprising a common sequence of messages, each common message being associated with a common sequential message identifier (SMI);

send a message to said message subscriber and recording the associated common SMI in association with said subscription at said message broker;

in response to a restart of said message subscriber, determine whether all of said message brokers are available, and when all of said message brokers are not available, determine a latest saved SMI for said subscription at any one of said message brokers; and send said associated common SMI to said message subscriber in response to a request therefrom.

17. The computer program product according to claim 16 wherein if executed, the computer usable code causes a computer to:

in response to a request for a subsequent message to a given SMI, send said subsequent message.

18. The computer program product according to claim 17 wherein if executed, the computer usable code causes a computer to:

in response to said sending of said subsequent message, discard said subsequent message and any queued prior messages in said sequence.

19. The computer program product according to claim 16, wherein said sending of said message to said message subscriber and said recording of said associated common SMI for said subscription are performed in a single unit of work.

20. The computer program product according to claim 16, wherein said associated common SMI is saved to persistent storage.

* * * * *